(12) United States Patent
Reber

(10) Patent No.: US 10,729,995 B2
(45) Date of Patent: Aug. 4, 2020

(54) HIGH VOLUME LOW LEVEL STRAINER

(71) Applicant: Larry F. Reber, Apple Creek, OH (US)

(72) Inventor: Larry F. Reber, Apple Creek, OH (US)

( * ) Notice: Subject to any disclaimer, the term of this patent is extended or adjusted under 35 U.S.C. 154(b) by 309 days.

(21) Appl. No.: 15/860,251

(22) Filed: Jan. 2, 2018

(65) Prior Publication Data

US 2018/0117507 A1 May 3, 2018

Related U.S. Application Data

(62) Division of application No. 14/529,615, filed on Oct. 31, 2014, now Pat. No. 9,889,395.

(60) Provisional application No. 61/898,652, filed on Nov. 1, 2013.

(51) Int. Cl.
| | |
|---|---|
| *B01D 35/02* | (2006.01) |
| *F04F 5/10* | (2006.01) |
| *A62C 33/00* | (2006.01) |

(52) U.S. Cl.
CPC .............. *B01D 35/02* (2013.01); *A62C 33/00* (2013.01); *F04F 5/10* (2013.01)

(58) Field of Classification Search
CPC ........ B01D 29/56; B01D 35/02; A62C 33/00; A62C 35/68; F04F 5/10
See application file for complete search history.

(56) References Cited

U.S. PATENT DOCUMENTS

| | | |
|---|---|---|
| 154,158 A | 8/1874 | Spooner |
| 539,800 A | 5/1895 | Durant |
| 615,847 A | 12/1898 | Hansen |
| 704,012 A | 7/1902 | Emerson |
| 705,364 A | 7/1902 | Kurtz |
| 785,125 A | 3/1905 | Shafer |
| 857,519 A | 6/1907 | Foster |
| 882,098 A | 3/1908 | Chial |

(Continued)

FOREIGN PATENT DOCUMENTS

JP 11104258 A * 4/1999

OTHER PUBLICATIONS

Akron Brass Company; Technical Data: Theoretical Discharge and Reaction for Solid Bore Nozzles; 1 page; available at http://www.akronbrass.com/resources-performance-discharge-reaction/; Downloaded Oct. 30, 2014.

(Continued)

*Primary Examiner* — Terry K Cecil
(74) *Attorney, Agent, or Firm* — Hahn Loeser & Parks LLP

(57) ABSTRACT

Methods for drafting or transferring water from a water supply to a fire pump in fire service include a strainer, the strainer having a hood member with an open bottom inlet having an inlet aperture, an outlet having an outlet aperture, a suctioning structure extending away from the open bottom inlet of the hood member, and the suctioning structure having a base offset from the open bottom inlet. Method of using the strainer including immersing a strainer in a water supply, fluidly connecting the outlet to a suction side of a pumping apparatus, activating the pumping apparatus, transferring water through the hood member, directing the strainer toward the bottom of the water supply and maintaining the strainer at the bottom of the water supply.

16 Claims, 5 Drawing Sheets

(56) References Cited

U.S. PATENT DOCUMENTS

| | | |
|---|---|---|
| 950,715 A | 3/1910 | Brindle |
| 1,209,800 A | 12/1916 | Barber |
| 1,842,043 A | 1/1932 | Modra et al. |
| 1,905,919 A | 4/1933 | Levis |
| 1,945,824 A | 2/1934 | Saxe |
| 1,967,785 A | 7/1934 | Schacht |
| 2,249,020 A | 7/1941 | McFarlin |
| 2,300,952 A | 11/1942 | May |
| 2,374,756 A | 5/1945 | Kisch et al. |
| 2,490,443 A | 12/1949 | Knipper |
| 2,503,455 A | 4/1950 | Sheren |
| 2,572,173 A | 10/1951 | McFarlin |
| 2,580,209 A | 12/1951 | Wiley |
| 2,596,151 A | 5/1952 | Hudson |
| 2,754,003 A | 7/1956 | Fenner |
| 2,783,893 A | 3/1957 | Romanoff |
| 3,037,636 A | 6/1962 | McFarlin |
| 3,109,812 A | 11/1963 | McAulay et al. |
| 3,206,036 A | 9/1965 | Hawley |
| 3,291,313 A | 12/1966 | Davis |
| 3,323,536 A | 6/1967 | O'Connor et al. |
| 3,495,714 A | 2/1970 | Barton |
| 3,613,894 A | 10/1971 | Clegg, Jr. |
| 3,643,802 A | 2/1972 | Jackson, Jr. |
| 3,759,330 A | 9/1973 | Rainey et al. |
| 4,152,264 A | 5/1979 | Hanna, Sr. |
| 4,179,379 A | 12/1979 | Mitchell |
| 4,357,238 A | 11/1982 | Ziaylek, Jr. |
| 4,943,211 A | 7/1990 | Boegh |
| 5,082,013 A | 1/1992 | Scheib |
| 5,509,437 A | 4/1996 | Merrett |
| 5,578,220 A | 11/1996 | Becktold |
| 5,650,073 A | 7/1997 | Merrett |
| 5,695,649 A | 12/1997 | Becktold |
| 5,711,886 A | 1/1998 | Long |
| 5,723,044 A | 3/1998 | Gleason et al. |
| 5,797,421 A | 8/1998 | Merrett |
| 5,851,385 A | 12/1998 | Merrett |
| 5,922,197 A | 7/1999 | Sparks |
| 6,146,105 A | 11/2000 | Williams |
| 6,386,049 B1 | 5/2002 | Schrumm |
| 6,401,829 B1 | 6/2002 | Newton |
| 6,638,435 B2 | 10/2003 | Loreno |
| 6,682,651 B1 | 1/2004 | Toland et al. |
| 6,949,198 B2 | 9/2005 | Reber |
| 7,201,842 B2 | 4/2007 | Kiefer |
| 7,273,545 B1 | 9/2007 | Lloyd |
| 7,575,677 B1 | 8/2009 | Barnes |
| 7,780,013 B1 | 8/2010 | Kern |
| 8,192,622 B2 | 6/2012 | Kozey |
| 8,297,448 B2 | 10/2012 | Watson |
| 8,679,335 B1 | 3/2014 | Dufort |
| 8,834,713 B1 | 9/2014 | Merrett |
| 9,272,170 B2 | 3/2016 | Hubbell, Jr. |
| 9,416,920 B2 | 8/2016 | Veinbergs |
| 2004/0164031 A1 | 8/2004 | Reber |
| 2006/0289346 A1 | 12/2006 | Kiefer |
| 2008/0061010 A1 | 3/2008 | Tom |
| 2014/0083724 A1 | 3/2014 | Hubbell, Jr. |
| 2015/0122716 A1 | 5/2015 | Reber |

OTHER PUBLICATIONS

Akron Firefighting Equipment; Discharge Table for Water Flow Test Kit—Style 9015; 1 page; Document No. 707328; no date available.

Task Force Tips; A03HNT-JET Low-Level Strainer; 1 page; available at www.tft.com; 2013.

Task Force Tips; Manual: High Volume Low-Level Suction Strainer; 4 pages; available at www.tft.com; May 9, 2013.

GBW Associates, LLC; Jet Siphon Flow Performance Tests; 33 pages; available at www.gotbigwater.com/content/data/file/Jet%20Siphon%20Flowtests.pdf; Jul. 7, 2012.

* cited by examiner

HIGH VOLUME LOW LEVEL STRAINER

This application claims priority to, and the benefit of, U.S. patent application Ser. No. 14/529,615, filed Oct. 31, 2014 with the United States Patent Office, which claims priority to, and benefit of, U.S. Provisional Patent Application No. 61/898,652, filed Nov. 1, 2013 with the United States Patent Office, all of which are herein incorporated by reference.

BACKGROUND

This invention relates in general to high volume strainers, and particularly to high volume low level strainers. More particularly, this invention relates to a high volume low level strainer for use in fire service while drafting or transferring a water or liquid from a water supply to a fire pump.

One of the most efficient means to provide water to a fire in non-hydrant areas of the country is by bringing the water supply in by tanker truck. Such a truck is often referred to as a tanker. To assure sufficient water supply a tanker will deposit water to a water supply at the fire. This process is referred to as tanker or tender. The tanker is then free to leave the fire to acquire more water. Furthermore, multiple water supplies may be used in order to have water available in the event a tanker has not returned with another load of water.

The water in the water supply is transferred to the fire by drawing the water in a process often referred to as drafting. Drafting or pulling water from a water supply is a common practice by Fire Departments in non-hydrant areas of the country. The water is often pulled from the water supply, such as a portable tank, by a truck with a fire pump. Such a truck is often referred to as a pumper. The pumper is then used to apply the water to the fire.

Often water sources, such as a portable tank, contain debris. Most pumpers cannot process this debris since they use a centrifugal close tolerance pump. To keep the debris from entering the pumper, strainers are used. Strainers are common when drafting water from a water supply. Current strainers are known to include solid pans positioned at their base. These pans limit the volume of water being drafted. Furthermore, strainers of this kind are known to levitate in the water supply when drafting. This allows air to be drafted causing the pumper to cavitate and lose prime. These problems increase when the flow of the water is increased, especially at rates over 900 gallons per minute. In view of these and other deficiencies, a strainer is needed to draft increased volumes of water at increased flow rates, up to or above 1650 gallons per minute.

SUMMARY

This invention relates in particular to a small, portable, and lightweight strainer for drafting water at high volumes, up to or above 1650 gallons per minute, from a water supply while maintaining its position to the bottom of a water source (i.e. does not levitate). In particular embodiments the invention comprise the step of immersing a strainer in a water supply. The strainer having a hood member with an open bottom inlet. The open bottom inlet having an inlet aperture for water to pass through. The hood member additionally having an outlet. The outlet having an outlet aperture for water to pass through. Extending away from the open bottom inlet is a suctioning structure. The suctioning structure having a base offset from the open bottom inlet.

Particular embodiments of the invention further comprise fluidly connecting the outlet to a suction side of a pumping apparatus. The pumping apparatus may be activated and water transferred. In particular embodiments, the water is transferred by inducing a flow of water from the water supply through the hood member. The flow of water is induced toward the suction side of the pumping apparatus. To reach the pumping apparatus the water enters the hood member through the open bottom inlet and exits the hood member through the outlet.

In yet other embodiments, the strainer is directed towards a bottom of the water supply using the suctioning structure. The suctioning structure is configured to form a partial vacuum between the hood member and the bottom of the water supply. This may be accomplished by using the flow of water. To provide the flow of water into the hood member, the hood member is offset from the bottom of the water supply by way of the suctioning structure.

Similarly, the strainer can be maintained at the bottom of the water supply using the suctioning structure. The suctioning structure is configured to maintain a partial vacuum between the hood member and the bottom of the water supply. To accomplish this, the hood member and bottom of the water supply are in fluid communication through the base of the suctioning structure. The water passing through the suctioning structure can be discharged from the discharge side of the pumping apparatus.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
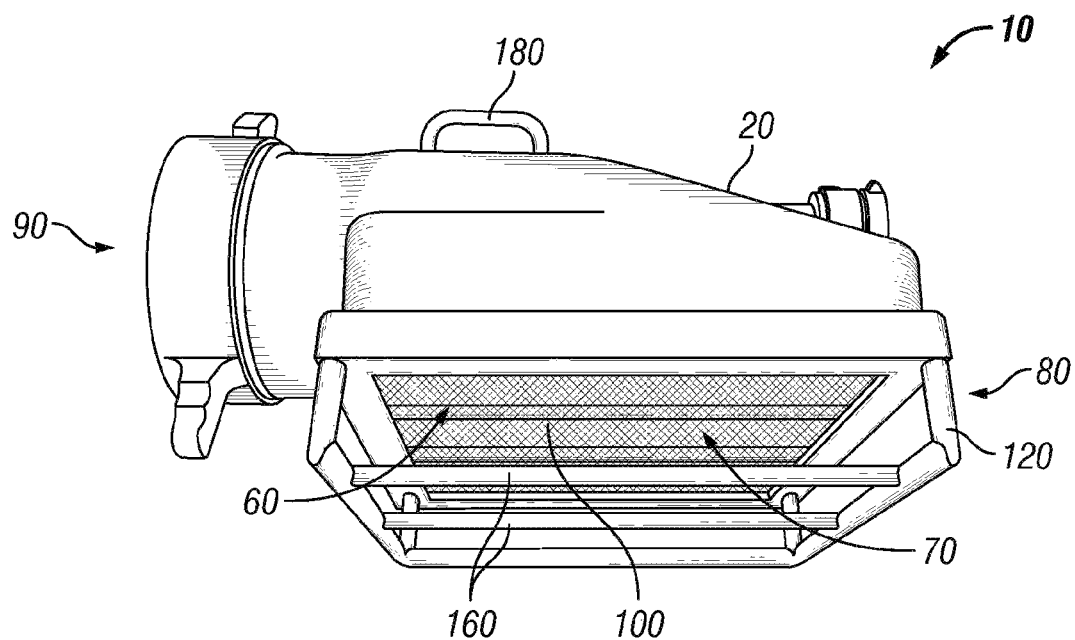
FIG. 1 is a perspective view taken from the bottom of a high volume low level strainer, the high volume low level strainer having a suctioning structure, in accordance with an embodiment of the invention.

As noted above, a strainer is needed for drafting water at high volumes, up to or above 1,650 gallons per minute, from a water or liquid supply while maintaining the position of the strainer at the bottom of the water supply. The most successful way to suppress or extinguish a fire is to supply a sufficient amount of water on the fire to cool the temperature of the fire. This is accomplished by applying high volumes of water from the water supply to the fire. To cool the fire, water is used to suppress the fire or cool the fuel source, extinguishing the fire. This is accomplished by removing heat from the fire and making the fire non-combustible or removing energy from the fuel source. A sufficient amount of water must be applied to the fire to reduce the temperature of the fire or the fuel source in order to suppress or extinguish the fire. Alternatively, water can be used to smother the fire by diluting the oxygen necessary to maintain the fire. This is accomplished by supplying a sufficient amount of water to displace the oxygen within the fire. Upon contacting the fire, water vaporizes thereby displacing the oxygen at the fire. To suppress or extinguish the fire, high volumes of water are necessary to accomplish the necessary cooling. Therefore, a strainer is needed for drafting water at high volumes, up to or above 1,650 gallons per minute, from a water supply while maintaining the position of the strainer at the bottom of the water supply. As used herein, water is used to identify liquid fluids used for fire suppression, including water, water with additives, alternatives to water, and any combination thereof.

Methods and apparatuses for drafting water at a high volume using a strainer are disclosed herein in accordance with particular embodiments. The methods and apparatuses disclosed increase the success for firefighting operations and increase the safety of firefighters and property owners. In particular, the methods and apparatuses disclosed herein increase the volume of water applied to a fire thereby reducing the amount of time required to fight the fire and, specifically, fires in rural areas.

In particular embodiments, the invention comprises a step of immersing a strainer in a water supply. A water supply as referred to herein includes a portable tank. However, a water supply can further include permanent structures for holding water, natural structures for holding water, and any combination thereof. The strainer having a hood member with an open bottom inlet, an outlet having an outlet aperture, and a suctioning structure extending away from the open bottom inlet of the hood member. The hood member can take any shape known in the art, including a funnel, a box, a cylinder, etc. The hood member having a chamber between the open bottom inlet and the outlet. The chamber forming a substantially uninterrupted water pathway from the open bottom inlet of the hood member to the outlet of the hood member.

The hood member can be further configured to reduce turbulent flow and eddies for maximizing efficiency, including rounded edges and fluent joints. By example, the chamber can form a funneling structure that reduces in size from the open bottom inlet to the outlet. Additional components and connections, including jet siphons, can be further formed within or connected to the hood member.

In particular embodiments, the open bottom inlet has an inlet aperture. The inlet aperture being located between the enclosed chamber of the hood member and the water supply about the strainer. When the hood member is immersed in a water supply, the inlet aperture provides a pathway for water to pass from the water supply about an outside portion of the hood member into the chamber of the hood member. In one embodiment, the water supply additionally passes through a screen member. The screen member being positioned to cover the inlet aperture of the open bottom inlet. The screen member configured to allow the water to pass from the water supply into the hood member through the inlet aperture while filtering undesired materials or debris from passing through the inlet aperture. The screen can be sized accordingly, depending upon the water desired to pass and the size of the undesired materials to be separated.

In one particular embodiment the strainer includes a screen member covering the open bottom inlet. Multiple screen members can also be used at various locations on the strainer. By example the screen member can be located at the inlet aperture, the outlet, the outlet aperture or at the suctioning structure. The screen member can additionally be configured to shed the debris so not to restrict the water flow into the strainer or restrict the vacuum formed between the open bottom inlet of the hood member and the bottom of the water supply. This may include attaching the screen member to the strainer at an angle thereby allowing debris to shed back into the water supply. The screen member can also be configured of any shape to accomplish the same. Alternatively, channels can be formed in the screen member to catch and maintain the debris away from the flow path through the screen member and strainer.

In one particular embodiment, the screen member is connected to the strainer. This can include attaching the screen member to the hood member, the strainer or suctioning structure. Further, one or more support bracing members can extend across the open bottom inlet to support the screen member when drafting water at high volumes. The one or more bracing members support the screen member from moving, bending or breaking under the vacuum pressure developed by the suction side of the pumping apparatus, discussed in more detail below. Moreover, the support braces can be used to attach the screen member to the strainer. It is contemplated the attachment mechanism for attaching the screen member to the strainer or the support braces is by any mechanical means known in the art including nuts and bolts, welds, adhesives and combinations thereof. This can further include permanently attaching, adjustably attaching and removably attaching the screen.

Particular embodiments include a suctioning structure extending from the hood member. In various embodiments, the suctioning structure comprises a base offset from the open bottom inlet and for contacting a bottom of a water supply. The suctioning structure extends from the hood member such that upon immersing the strainer in a water supply and positioning the base at the bottom of the water supply the open bottom inlet of the strainer is supported away from the bottom of the water supply. In this manner, the inlet aperture of the open bottom inlet is open to and in fluid communication with the bottom of the water supply through the base. The relationship between the open bottom inlet of the hood member and the bottom of water supply is discussed in more detail in the various embodiments below.

In one particular embodiment, in order for the suctioning structure to provide the desired relationship between the open bottom inlet of the hood member and the bottom of the water supply the suctioning structure is formed by one or more rods mounted to the hood member. Rods include bars, angle members and the like. The rods extend away from the open bottom inlet of the hood member. The rods can further extend across the open bottom inlet of the hood member forming the base. Upon immersing the strainer in the water supply it is positioned at the bottom of the water supply such that the rods of the suctioning structure contact the bottom of the water supply. Since the rods extend from the open bottom inlet of the hood member, the open bottom inlet of the hood member is maintained a predetermined distance from the bottom of the water supply. The rods extending across the open bottom inlet of the hood member are further configured such that the open bottom inlet is substantially open to and in fluid communication with the bottom of the water supply. Alternative embodiments for the suctioning structure further include feet, braces, wheels and combinations thereof, additionally extending from the open bottom inlet of the hood member.

The suctioning structure can be permanently attached to the hood member using any connection means known in the art, including nuts and bolts, welding, adhesive and any combination thereof. Alternatively, the suctioning structure can be adjustable in relation to the hood member. Further, the suctioning structure can be removably attached to the hood member to accommodate adjustment or maintenance. Again, these alternative structures for the suctioning structure are configured such that the open bottom inlet is substantially open to and in fluid communication with the bottom of the water supply.

The suctioning structure is positioned at the bottom of the water supply upon immersing the strainer in a water supply. By placing the suctioning structure at the bottom of the water supply the open bottom inlet is additionally immersed in the water supply. This allows the water to be drafted through the open bottom inlet and into the suction side of the pumping apparatus. The pumping apparatus being connected to the strainer at the outlet and, by example, at a hose connection positioned near or about the outlet. Further this allows the vacuum to be formed between the open bottom inlet of the hood member and the bottom of the water supply, as discussed in further detail below.

Particular embodiments of the method for drafting water at a high volume using a strainer include a step of fluidly connecting the outlet to a suction side of a pumping apparatus. In order to create the vacuum at the open bottom inlet of the hood member and the bottom of the water supply, the strainer is fluidly connected to the pumping apparatus. In particular, the strainer is fluidly connected to the suction side of a pumping apparatus at the outlet of the hood member. The connection may further include a length of hose or conduit extending between the pumping apparatus and the hose connection located at the outlet. In one particular embodiment, the hose connection is a 6" N.H. female swivel for connecting to a 6" fire hose. However, the connection can be any dimension known by one skilled in the art to achieve the volume of water desired or to adapt to the desired hose, conduit or pumping apparatus. Upon connecting the pumping apparatus to the outlet, the strainer is in fluid communication with the pumping apparatus and should be sufficiently sealed to maintain vacuum.

Particular embodiments of the method for drafting water at high volume using a strainer include activating the pumping apparatus. Generally, a mechanical pumping apparatus is used in fire fighting operations and is discussed below. However, other pumping apparatuses known in the art can be used. To activate the pumping apparatus the pumping apparatus is connected to a power source. The power source can be a electric motor, gasoline engine, diesel engine, or the like. As discussed herein the power source is the engine of the pumper on which the pumping apparatus is located. To activate the pumping apparatus, energy is transferred from the power source to the pumping apparatus moving the mechanical components. The mechanical components for a pumping apparatus are those known in the skill of the art, including a mechanical or air primer (i.e. primes the fire pump) for pumping water. The pumping apparatus can be further activated and controlled by a controller or switch (i.e. pressure governor and manual pressure relief). The controller can operate the pumping apparatus automatically or manually. The controller can further operate the speed or the function of the pumping apparatus based upon many variables, including rate of rotation (i.e. revolutions per minute (RPM)), volumetric flow rate (i.e. gallons per minute (GPM)), and pressure (i.e. pounds per square inch (PSI)), Sensors, including flow sensors and pitot gauges, can be further utilized on either the suction side or discharge side of the pumping apparatus to activate or send signals to control the controller and/or pumping apparatus.

Particular embodiments of the method for drafting water at high volume using a strainer further include transferring water. The water is transferred from the water supply through the hood member into the suction side of the pumping apparatus. In order to transfer the water, the pumping apparatus creates at least a partial vacuum at the suction side of the pumping apparatus. The vacuum is additionally generated at the strainer which is in fluid communication with the suction side of the pumping apparatus through the outlet. The vacuum creates a water flow from the water supply (i.e. portable tank) to the strainer. A region of low pressure is created by the water flow at the open bottom inlet of the hood member. The water is forced from an area of higher pressure (i.e. atmospheric pressure) within the water supply to the region of low pressure created by the water flow. Thereby, the water enters the hood member through the open bottom inlet and exits the hood member through the outlet toward the source of the vacuum on the suction side of the pumping apparatus.

Particular embodiments of the method for drafting water at high volume using a strainer include directing the strainer towards a bottom of the water supply using the suctioning structure. The suctioning structure is configured to form a partial vacuum between the hood member and the bottom of the water supply using the flow of water wherein the hood member and the bottom of the water supply are in fluid communication. In this particular embodiment, the strainer is directed to the bottom of the water supply when the partial vacuum overcomes the buoyancy of the strainer and other forces, including turbulent flow. Turbulent flow is created by velocity fluctuations and eddies. Herein, as the volumetric flow rate increases at the strainer so does turbulent flow in and around the strainer. The increased turbulent flow can cause the strainer to become unstable. Due to this instability the strainer can lift and/or turn thereby causing cavitation. As a result, the pumping apparatus can stop, fail, and/or the strainer can be lifted to the surface of the water supply. To counteract these forces, including buoyancy and turbulent flow, the strainer is forced toward to the bottom of the water supply using the suctioning structure. The suctioning structure configured at the bottom of the strainer to generate a partial vacuum between the hood member and the bottom of the water supply. The partial vacuum sufficient to overcome the forces, including buoyancy and turbulent flow.

Particular embodiments of the method for drafting water at high volume using a strainer include maintaining the strainer at the bottom of the water supply using the suctioning structure. The suctioning structure is configured to maintain a partial vacuum between the hood member and the bottom of the water supply wherein the open bottom inlet of the hood member and the bottom of the water supply are in fluid communication through the base of the suctioning structure. The suctioning structure is configured to maintain the open bottom inlet of the strainer a distance from the bottom of the water supply. This distance is maintained as the water flows from the water supply through the open bottom inlet, into the strainer, and to the suction side of the pumping apparatus. As discussed above, a vacuum is formed between the open bottom inlet and the bottom of the water supply. By maintaining the distance between the bottom of the water supply and open bottom inlet of the hood member the flow is maintained and the vacuum is maintained.

By maintaining the vacuum the position of the suctioning structure is maintained at the bottom of the water supply. As the volumetric flow is increased at the pumping apparatus the vacuum force is further increased between the open bottom inlet of the hood member and the bottom of the water supply. Therefore, although increased volumetric flow can increase turbulent flow, as indicated above, the increased vacuum force is sufficient to overcome any movement of the strainer at the bottom of the water supply caused by these forces. Alternatively, the volumetric flow can additionally be decreased while the vacuum is additionally maintained providing for adjustment in the flow rate. Thereby, although the volumetric flow through the pumping apparatus can change, the vacuum force at the open bottom inlet of the strainer and the water supply is sufficiently maintained.

Since the suctioning structure uses a vacuum to direct and maintain the strainer to the bottom of the water supply the strainer can be constructed of light materials and of any size. These materials can include metals (i.e. steel, aluminum, etc.) and polymers or a combination thereof. The strainer can be of any weight. However, by example, the strainer can weigh less than 20 pounds and still maintain its position at the bottom of the water supply without lifting or levitating at high volumes. In contrast, other strainers utilize the weight of the strainer to maintain the strainer at the bottom of the water supply. Therefore, other strainers are constructed from much heavier materials which decrease the portability of the device and can additionally increase the cost to manufacture the device. Similarly, other strainers may be constructed at an increased size to further increase the weight. Further, when the heavier strainers are at a maximum flow and begin to lift and/or turn due to forces, such as buoyancy and turbulent flow, additional weight is further applied to the devices during drafting operations. It is common for metal chains to be thrown over the strainer to keep the strainer at the bottom of the water supply. Use of the metal chains or any additional weighting materials decreases the portability of the device, takes space that can be allocated to additional fire fighting apparatuses and takes the attention of the fire fighters from the fire at hand.

Particular embodiments of the method for drafting water at high volume using a strainer include discharging the water supply from a discharge side of the pumping apparatus. Once the water flow enters the suction side of the pumping apparatus it progresses through the pumping apparatus until it discharges from the discharge side of the pumping apparatus. The discharge side of the pumping apparatus can be further connected to a hose and or a tip for aiming and controlling the water discharge. One of ordinary skill in the art recognizes that added apparatuses, hoses, and equipment further impact head loss over the entire system. Additionally head loss on the suction side of the pumping apparatus can be experience based upon the same features. Therefore, by using a strainer wherein volumetric flow can be provided at high volumes, up to or above 1,650 gallons per minute, this head loss can be overcome using a single apparatus. Discharge tables for water flow tests are available to one of ordinary skill in the art to determine the optimum flow rate. Therefore, by applying the particular embodiments of the strainer and achieving the optimum discharge using these resources, one of ordinary skill in the art can achieve further increased flow rates by using a strainer that is maintained at the bottom of a water supply using a vacuum.

In yet other embodiments, the method for drafting water at high volume using a strainer include priming the pumping apparatus by filling the strainer and the pumping apparatus with a liquid water. In this step, the activated pumping apparatus will draw air until the strainer and the liquid water connection between the strainer and the pumping apparatus is filled with the liquid water. Once the strainer and the pumping apparatus is devoid of air and filled with liquid water then the pumping apparatus can create a vacuum on the suction side. Similarly, a pumping apparatus can lose prime if too much air is introduced into the strainer and pumping apparatus. This is avoided by maintaining the strainer to the bottom of the water supply as described above.

In further embodiments, the method for drafting water at high volume using a strainer include creating a jet effect within the hood member by providing a secondary pressurized source. A secondary pressurized source can further include a jet siphon tube. The jet siphon tube extending into the hood member. The jet siphon tube have a jet siphon inlet connected to a pressurized source. The pressurized source forces pressurized water into the jet siphon tube. The jet siphon tube having an outlet or jet siphon discharge extending into the hood member. The pressurized water discharges from a jet siphon discharge into and in the direction of the water flow within the hood member thereby increasing the velocity of water flow within the hood member. The jet siphon can further include a VENTURI orifice to further increase the rate of discharge. To reduce turbulent flow and eddies, the jet siphon tube can be integrally formed within the hood member. The position of the jet siphon discharge can be further adjusted. This includes providing a jet siphon tube that is adjustable. The jet siphon discharge can be positioned anywhere within the hood member including extending into the outlet. To this end, although a strainer can include a jet siphon tube, the jet siphon tube need not be used. A cap or plug can be provided over the jet siphon inlet when it is not in use. Likewise a cap or plug can additionally or alternatively be provided over the jet siphon discharge. The jet siphon tube can be sized as required to achieve the optimum pressurization or to connect to the available secondary pressurized source. In one particular embodiment, the inside diameter of a tube forming the jet siphon is ¾" or smaller.

In one particular embodiment, a secondary jet siphon can be used to transfer water from a second water supply to one or more water supplies (i.e. the water supply from which the pumper is drafting) using multiple transfer mechanisms. In this manner, the above mentioned strainer can also be used in a series of tanks for transferring water. To transfer water between multiple tanks, the pumping capacity is reduced across the multiple transfer mechanisms. Thus, in one embodiment the inside diameter of the tube forming the jet siphon in any of the one or more strainers may be further reduced to ½" or smaller. By example, the reduction of the strainer requires using only approximately 78-88 gallons per minute of parasitic water from the primary pumpers capacity. In contrast, known transfer systems provide approximately 175-312 gallons per minute per transfer tube using a conventional 1" or 3" inside diameter of the tube forming the jet siphon.

The results of various embodiments of the present invention have been demonstrated in various tests with one set of test results reproduced herein. The test results demonstrate a high volume low level strainer that meets the long felt need for fire fighting in rural areas. Moreover, these test results illustrate the unexpected results by reaching flow rates approaching 1,650 gallons per minute using various embodiments of a high volume low level strainer, as described herein, while maintaining the high volume low level strainer at the bottom of the water supply without applying additional weight or support. The documented results for a test performed on Aug. 27, 2014, at Apple Creek Fire Department in Apple Creek, Ohio, produced results of 1,649 gallon per minute using an embodiment of the strainer disclosed herein. These results were produced without the aid of a jet siphon tube. In particular, the test utilized a single strainer located in a portable tank. The strainer was connected to a single stage pumper, rated at 1,500 GPM, using 14 feet of 6" hose. The flows were monitored using a Akron Brass Style 9015 Pitot Test Kit, the same test kit used on UL certification for fire pumps. The pumper was operated under a manual pressure relief. A 2¼" tip diameter was used at the discharge outlet. The recorded readings indicated approximately 250 PSI pressure at the pump discharge with a corresponding 124-125 PSI pressure at the discharge outlet. Using discharge tables for water flow tests, such as the chart published by Akron Firefighting Equipment entitled "Discharge Table for Water Flow Test Kit—Style 9015", the 124-125 PSI pressure corresponds to a discharge flow rate of 1,649 gallons per minute. These results were achieved while the strainer was maintained at the bottom of the portable tank without applying additional weight. These tests are illustrative of the capabilities of the various embodiments of the high volume low level strainer disclosed herein.

Figure 2:
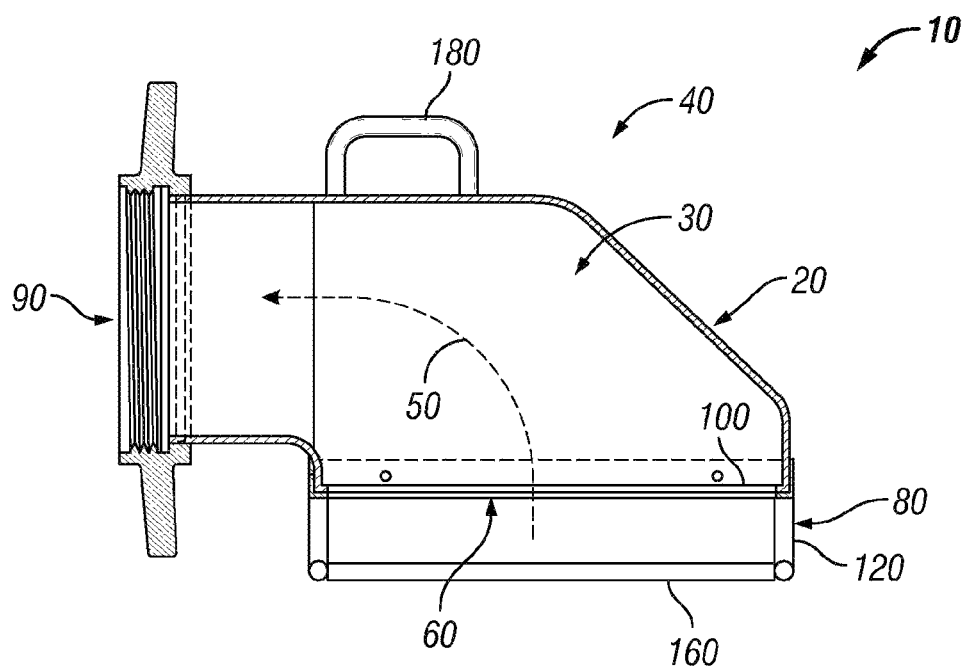
FIG. 2 is a side cross sectional view taken vertically across a high volume low level strainer, the high volume low level strainer having a suctioning structure, in accordance with an embodiment of the invention.

Referring now to the figures, one embodiment of a strainer 10 is illustrated in FIG. 1-FIG. 2. The strainer 10 includes a hood member 20, a screen member 100 and a suctioning structure 80. The hood member 20 is further illustrated separately from the screen member 100 and the suctioning structure 80 in FIG. 3-FIG. 4. The hood member 20 forms an enclosure with an open bottom inlet 60 and an outlet 90. The outlet 90 can be a threaded connection, quick couple connection, or other connection known in the art. At the open bottom inlet 60 is an inlet aperture 70. The inlet aperture 70 open to and providing a pathway between the chamber 30 of the hood member and the outside portion 40 of the strainer. The chamber 30 forming an enclosure extending from the open bottom inlet 60 to the outlet 90. A water passageway 50 is formed within the chamber from the open bottom inlet 60 to the outlet 90. As illustrated here, the chamber can form a taper or reducing funnel extending from the open bottom inlet 60 to the outlet 90. The reducing funnel can direct water flow to the outlet 90 through the water passageway 50, thus, unrestricting the water flow into the draft hose (not shown) connected to the outlet 90.

Figure 3:
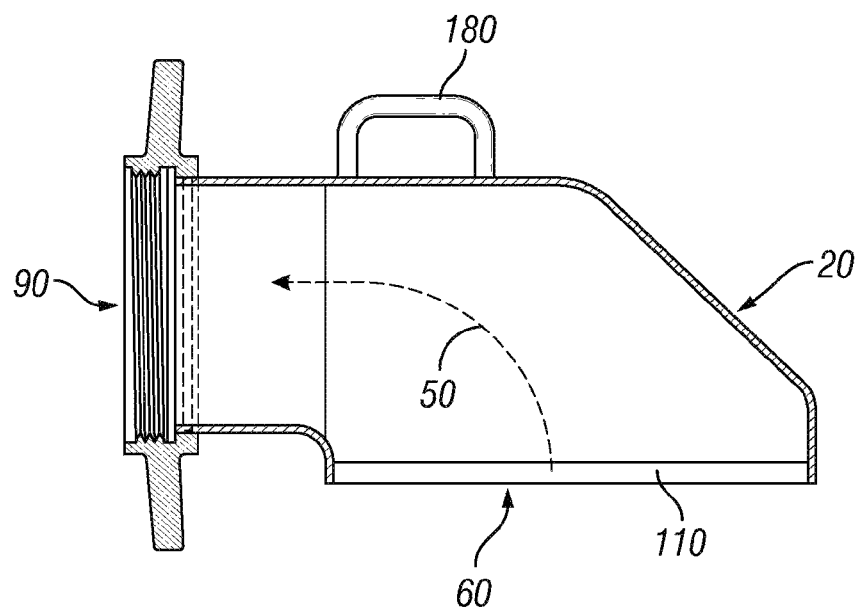
FIG. 3 is a side cross sectional view taken vertically across the hood member of the high volume low level strainer in accordance with an embodiment of the invention.

With specific reference to FIG. 2-FIG. 3, the reducing funnel, as illustrated by this embodiment, reduces restricting turns or elbows between the open bottom inlet 60 of the hood member 20 and at the outlet 90. This facilitates unrestricted water flow through the hood member 20 along the water passageway 50. Likewise, alternative configurations of the hood member 20, eliminating bends or elbows, are additionally contemplated to create unrestricted water flow from the inlet point to the outlet point at the outlet 90. Such configurations are further contemplated to include conical shapes.

Referring specifically to FIG. 2, The strainer 10 includes a screen member 100 attached to the open bottom inlet 60 of the hood member 20. The screen member 100 comprises a mesh or other filtering material. The mesh can be constructed of material known to be used in the field of art, including such materials as metals, polymers, or combinations thereof. In one embodiment, the screen member is constructed of aluminum metal mesh. A bracing member 110 can further extend across the screen member 100 to provide additional strength and stability thus resisting the forces exhibited at increased flow rates. The screen member 100 is attached to the strainer 10. As illustrated here, the screen member 100 is attached to the suctioning structure 80. However, the screen member can be alternatively or additionally be attached to the hood member 20 or bracing member 110. Attachment methods include permanent attachment, including welding, removable attachment, including bolting, or adjustable attachment. A removable screen member 100 further facilitates ease in maintenance and allows for adjusting the size of the mesh depending upon the application and water flow.

Figure 8:
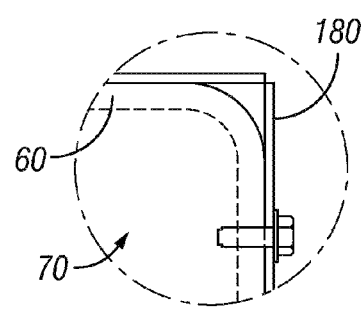
FIG. 8 is a partial view of the suctioning structure attaching to the hood member taken at 8 in FIG. 5 in accordance with an embodiment of the invention.

As additionally illustrated in FIG. 1-FIG. 2, the strainer 10 further includes a suctioning structure 80 for directing the strainer 10 to the bottom of the water source. The suctioning structure 80 is illustrated here having rods 120 that extend from the base of the hood member 20. The rods 120 can comprise of metal, polymers, or a combination thereof. The rods 120 can be attached to the hood member 20 by any mechanical means known in the art. FIG. 8 illustrates a bolt connection for attaching the suctioning structure 80 to the hood member 20 taken at 8 in FIG. 5. However, the rods may be permanently attached, removably attached, or adjustably attached by any means known in the art. Removability and adjustability facilitate height adjustment and maintenance. The adjusting is means can further include adjustable screws, predrilled holes, and clamping mechanisms.

Figure 5:
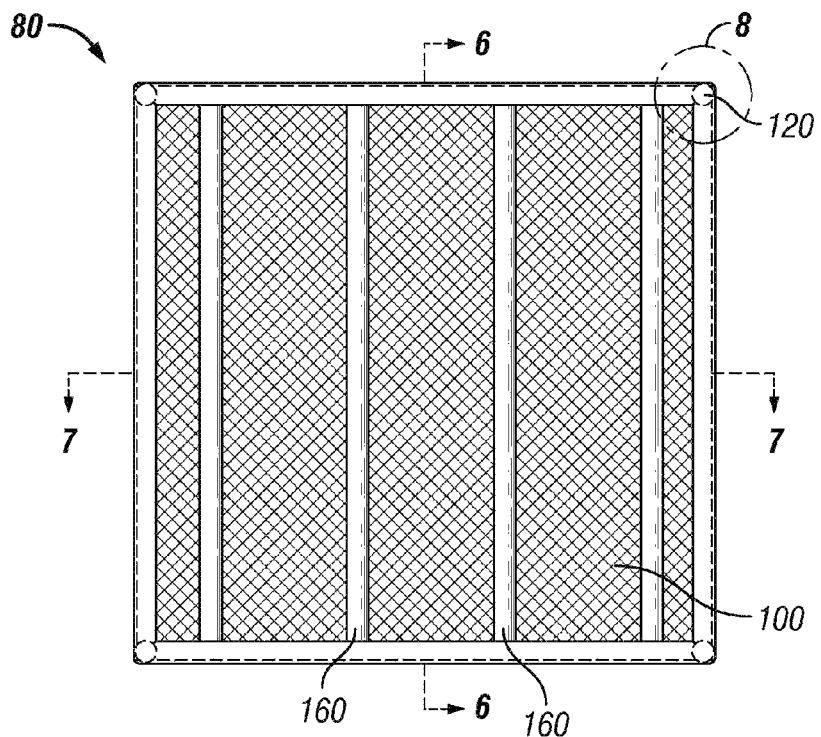
FIG. 5 is a bottom view of the suctioning structure, the suctioning structure having a screening member, in accordance with an embodiment of the invention.
Figure 6:
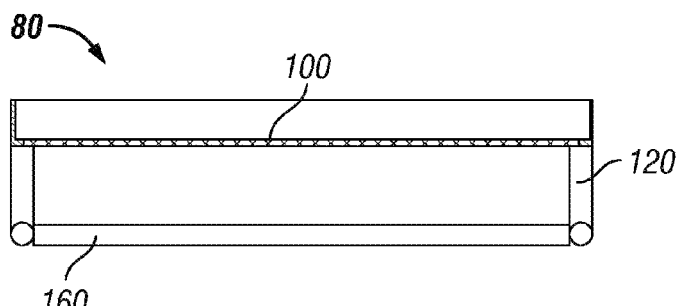
FIG. 6 is a side cross sectional view taken along line 6-6 in FIG. 5 across the suctioning structure, the suctioning structure having a screening member, in accordance with an embodiment of the invention.
Figure 7:
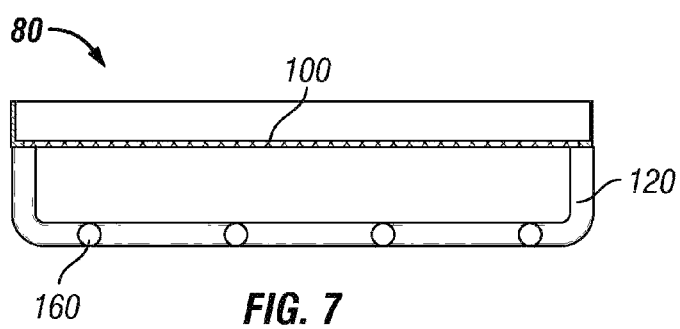
FIG. 7 is a side cross sectional view taken along line 7-7 in FIG. 5 across the suctioning structure, the suctioning structure having a screening member, in accordance with an embodiment of the invention.

In particular, the suctioning structure is illustrated separate from the hood member in FIG. 5-FIG. 7. FIG. 5 illustrates a bottom view of the suctioning structure 80. As illustrated in this embodiment, the rods 120 extend across the open bottom inlet 60 of the hood member 20 such that the open bottom inlet is substantially open to the water supply, including the bottom of the water supply through the suctioning structure 80. The rods 120 extending from and across the open bottom inlet 60 of the hood member 20 create a base for the strainer 10. This base keeps the open bottom inlet 60 of the hood member 20 from adhering to the bottom of the water supply when a partial vacuum is applied. Instead, the suctioning structure 80 adheres to the bottom of the water supply. This further prevents restricting the water flow and, alternatively, creates a region of low pressure and a vacuum between the hood member 20 and the bottom of the water supply. Said vacuum used to maintain the strainer 10 to the bottom of the water supply.

As mentioned above, the rods 120 can be adjustable so to create the desired clearance between the open bottom inlet 60 of the hood member 20 and the base of the suctioning structure 80. This clearance provides for the free flow of water into the open bottom inlet 60 of the hood member 20. When the suctioning structure is directed to and positioned at the bottom of the water supply the water flow passes between the hood member 20 and the suctioning structure 80 at the perimeter. The clearance configured to provide sufficient water flow into the strainer while maintaining the vacuum between the open bottom inlet of the hood member and the bottom of the water supply. This provides that (1) the high volume low level strainer 10 does not levitate or turn the open bottom inlet 60 of the hood member 20 toward the surface and (2) water flow is unrestricted into the open bottom inlet 60 of the hood member 20. Additional intermediate rods 160 may be added to increase rigidity at the base of the suctioning structure. Moreover, in the instance the bottom of the water supply is constructed of a tarp or pliable material, the rods 120 keep the pliable material from being forced into the suctioning structure 80, the screen member 100 or the open bottom inlet 60 of the hood member 20, upon applying the at least a partial vacuum.

FIG. 6 illustrates a cross sectional view of the suctioning structure 80 taken along line 6-6 in FIG. 5. Alternatively, FIG. 7 illustrates a cross sectional view of the suctioning structure taken along line 7-7 in FIG. 5. As illustrated by FIG. 6-FIG. 7 the rods 120 extend from the hood member 20 at each corner of the open bottom inlet 60. The rods 120 are illustrated attaching to a structure forming a perimeter about the open bottom inlet 60. Any structure can be used for attaching the rods 120 or the suctioning structure 80 to the hood member 20. By example, the rods 120 can be attached directly to the hood member 20. As illustrated by this embodiment, extending rods 120 from each corner of the open bottom inlet 60 provides balanced support across the open bottom inlet 60 of the hood member 20. This increases the stability of the suctioning structure 80 and the hood member 20 when at least a partial vacuum is applied. Herein, multiple rods 120 are illustrated to extend across the open bottom inlet 60. The multiple rods 120 are parallel to one another and are attached to a perpendicular rod 120 at each end. However, the rods 120 can extend across and from the open bottom inlet 60 in any direction. Moreover, the rods 120 can be bars, angle, flat stock, wheels, feet or the like.

In operation, the above described high volume low level strainer 10 is attached to a draft hose (not shown) at the outlet 90. The draft hose is further attached to a pumper truck (not shown) comprising a pumping apparatus for drafting water from a water supply. The water is drafted through the strainer 10 into the suction side of the pumping apparatus and then discharged through the discharge side of the pumping apparatus. As the pumping apparatus begins pumping water through the strainer 10 a vacuum is created at the open bottom inlet 60 of the hood member 20. The rods 120 extending from the open bottom inlet 60 of the hood member 20 prevent the base of the hood member 20 from attaching to the bottom of the water supply. Alternatively, the rods 120 extending across the open bottom inlet 60 of the hood member 20 also utilize the vacuum to contact the bottom of the water supply an maintain the position of the strainer 10 at the bottom of the water supply. As the volume of water increases, the vacuum at the base of the strainer additionally increases. This maintains the strainer to the bottom of the water supply even as the volumetric flow of water through the strainer is increased to up to and above 1,650 gallons per minute.

Figure 4:
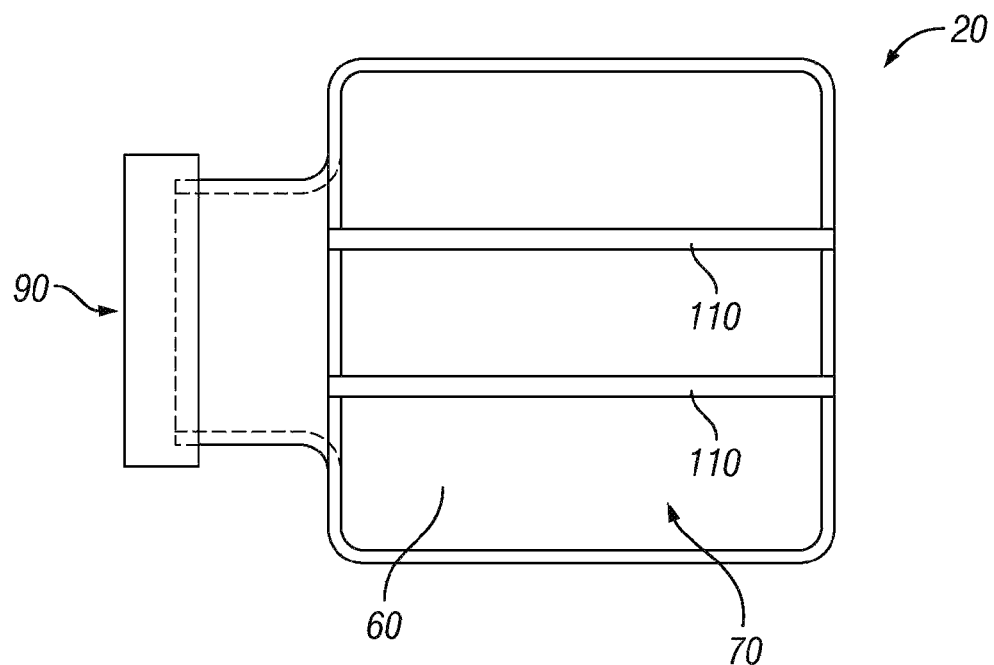
FIG. 4 is a top cross sectional view taken laterally across the hood member of the high volume low level strainer in accordance with an embodiment of the invention.
Figure 9:
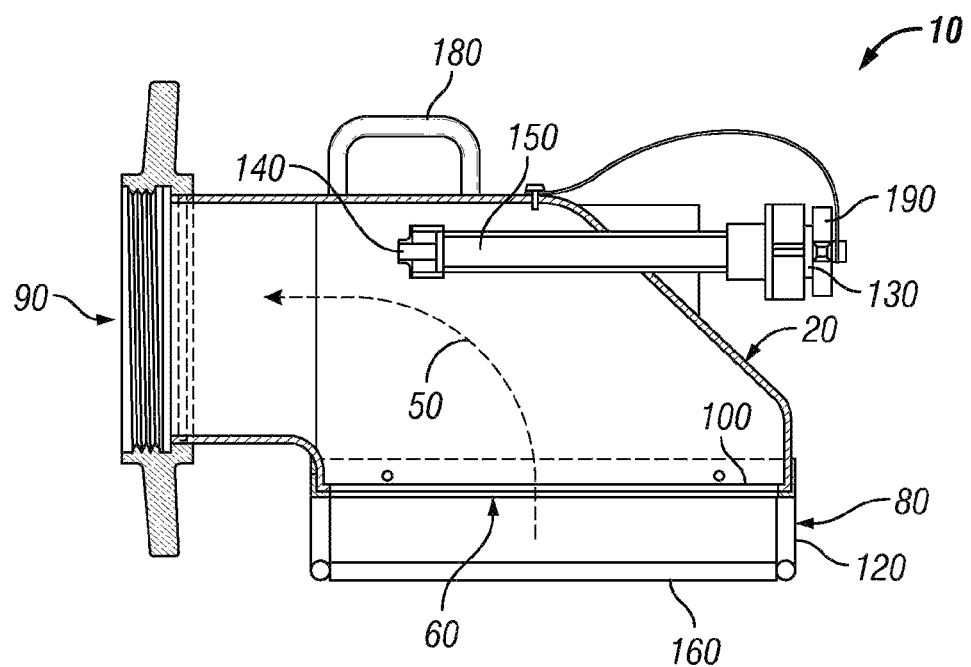
FIG. 9 is a side cross sectional view taken vertically across a high volume low level strainer, the high volume low level strainer having a suctioning structure and a jet siphon tube, in accordance with an embodiment of the invention.
Figure 10:
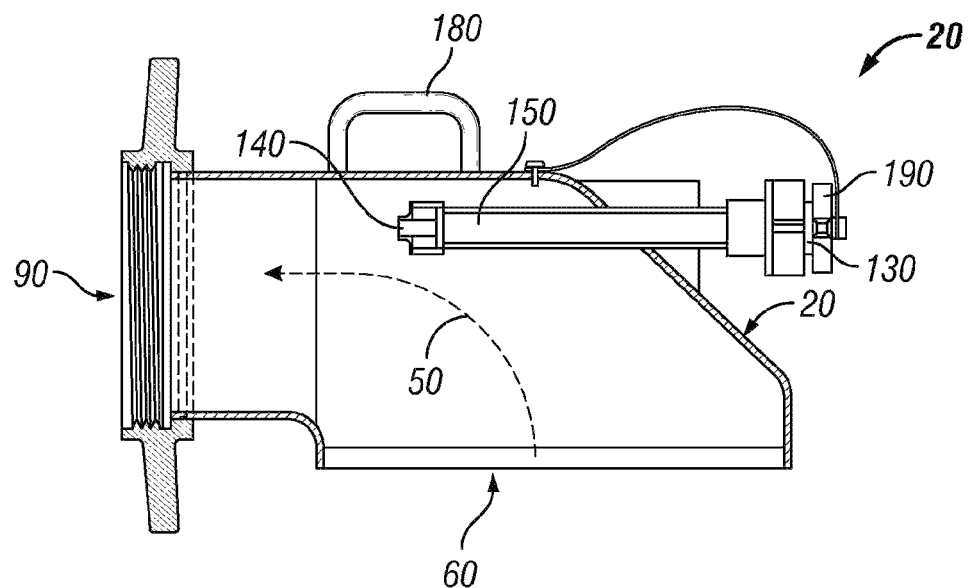
FIG. 10 is a side cross sectional view taken vertically across the hood member of the high volume low level strainer, the high volume low level strainer having a jet siphon tube, in accordance with an embodiment of the invention.
Figure 11:
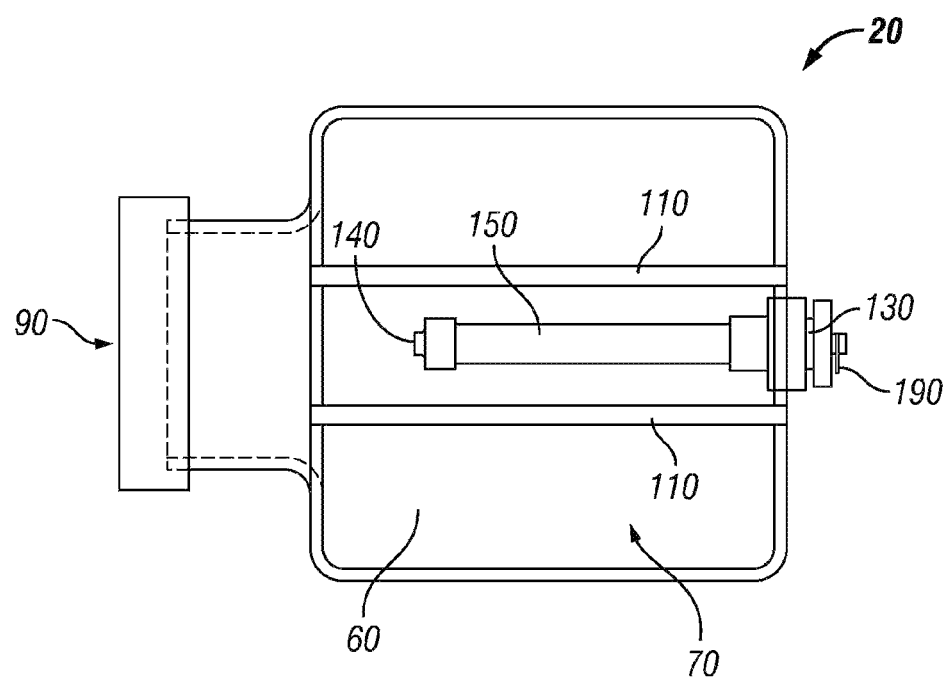
FIG. 11 is a top cross sectional view taken laterally across the hood member of the high volume low level strainer, the high volume low level strainer having a jet siphon tube, in accordance with an embodiment of the invention.

FIG. 9-FIG. 11 illustrate the embodiment as illustrated in FIG. 2-FIG. 4, respectively, further incorporating a jet siphon tube 150. The jet siphon tube 150 having an siphon inlet 130 and a siphon discharge 140. The siphon inlet 130 can be connected to a secondary pressure source (not shown) for increasing the velocity of the water flow using a jet effect within the hood member 20. The velocity of the water flow is increased by connecting the secondary pressure source at the siphon inlet 130. A water flow passes through the jet siphon tube 150 and discharges from the jet siphon tube 150 at the siphon discharge 140. A jet effect is created at the point of discharge within the hood member 20 and increases the velocity of the water flow passing through the hood member 20. The water discharges in the direction of the water flow within the hood member 20. The jet effect can be further increased by providing a VENTURI orifice or a reducing member within the jet siphon tube 150 at or about the siphon discharge 140.

In one particular embodiment, the pumping apparatus used at the strainer is the same pumping apparatus used to supply the secondary pressure source. In this instance, the water flow passing through the jet siphon tube 150 is considered parasitic water since any volume of flow reduces the capacity of the pumping apparatus, thereby reducing the amount of water available to extinguish the fire. However, in this particular embodiment the inside diameter of a conventional jet siphon tube is reduced. By example, the inside diameter of the jet siphon tube 150 is reduced to ½". The reduced inside diameter increases the pressure through the jet siphon tube 150 while reducing the volumetric flow rate through the jet siphon tube 150. Therefore, by reducing the inside diameter of the jet siphon tube, from a conventional jet siphon tube, the capacity of the pumping apparatus required to supply the secondary pressure source is reduced while increasing pressure at the jet siphon tube and increasing the transfer rates at the strainer. Thereby, the negative effects of the parasitic water is reduced. This embodiment can further include transferring water between more than two water supplies using multiple strainers.

As illustrated by FIG. 9-FIG. 11 although the strainer 10 has a jet siphon tube 150 the jet siphon tube 150 need not be used. By example a cap 190 is illustrated over the siphon inlet 130 when not in use. By using a cap 190 and/or a plug the hood member 20 is sealed at the siphon tube 150, thereby, allowing the strainer 10 to be used as illustrated by the embodiments in FIG. 2-FIG. 4.

The high volume low level strainer 10 may be constructed from many materials, including metals and polymers or a combination thereof. In the one embodiment the high volume low level strainer is constructed from a light weight aluminum. Since the above mentioned vacuum adheres the high volume low level strainer to the bottom of the water source it is not necessary that the apparatus be heavy. Therefore, lightweight materials further provide for a portable and small apparatus that can be easily stored. Furthermore, a handle 180 may be provided for mobility.

The terms "comprising," "including," and "having," as used in the claims and specification herein, shall be considered as indicating an open group that may include other elements not specified. The terms "a," "an," and the singular form of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things are intended. The terms "preferably," "preferred," "prefer," "optionally," "may," and similar terms are used to indicate that an item, condition or step being referred to is an optional (i.e., not required) feature of the invention.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A method for drafting water in fire fighting operations, the method comprising:
    completely immersing a strainer in a water supply, the strainer having a hood member with an open bottom inlet having an inlet aperture, an outlet having an outlet aperture, and a suctioning structure extending away from the open bottom inlet of the hood member, the suctioning structure having a base offset from the open bottom inlet for an unrestricted water flow into the open bottom inlet and through the hood member;
    fluidly connecting the outlet to a suction side of a pumping apparatus;
    activating the pumping apparatus;
    transferring water by inducing a flow of water from the water supply through the hood member toward the suction side of the pumping apparatus, the water entering the hood member through the open bottom inlet and exiting the hood member through the outlet;
    directing the strainer towards a bottom of the water supply;
    forming a partial vacuum between the hood member and the bottom of the water supply using the flow of water and causing the base of the suctioning structure to adhere to the bottom of the water supply;
    maintaining the partial vacuum between the hood member and the bottom of the water supply by creating a region of low pressure between the hood member and the bottom of the water supply where the partial vacuum overcomes buoyancy of the strainer and upward forces exerted by turbulent flow to maintain the strainer at the bottom of the water supply while the strainer is completely immersed in the water supply; and
    discharging the water supply from a discharge side of the pumping apparatus.

2. The method of claim 1 wherein the flow of water is at or above 1650 gallons per minute.

3. The method of claim 2 where the strainer does not levitate.

4. The method of claim 1 further comprising the step of:
    priming the pumping apparatus by filling the strainer and the pumping apparatus with the water and maintaining prime during the step of transferring.

5. The method of claim 1, where the step of transferring comprises:
    arranging a substantially uninterrupted water pathway for the water to pass through the strainer configured to reduce eddies and turbulent flow within the strainer.

6. The method of claim 1, further comprising the step of:
    creating a jet effect within the hood member by providing a secondary pressurized water source using a jet siphon tube extending into the hood member.

7. The method of claim 6, where the step of creating a jet effect comprises:
    reducing parasitic water using the secondary pressurized water source by reducing an inside diameter of the jet siphon tube to ½" or smaller.

8. The method of claim 7, where the step of creating a jet effect further comprises:
    increasing transfer rates using the secondary pressurized water source.

9. The method of claim 6, where the jet siphon tube has an inside diameter of less than ¾".

10. The method of claim 6 where the jet siphon tube is integrally formed in the hood member.

11. The method of claim 1 where the base of the suctioning structure includes a plurality of rods that extend downwardly from bottom corners of the hood member.

12. The method of claim 11 where the plurality of rods extend across the open bottom inlet of the hood member.

13. The method of claim 1 where a handle is attached to an upper outer surface of the hood member.

14. The method of claim 1 where a screen member extends across the open bottom inlet.

15. The method of claim 14 where the screen member is attached to the hood member.

16. The method of claim 1, further comprising the step of:
    providing a second strainer in a second water supply where the second strainer is in series with the strainer to form a multiple transfer mechanism.

* * * * *